United States Patent [19]

Gudzin

[11] 4,197,479
[45] Apr. 8, 1980

[54] INTRUSION DETECTING SENSOR ASSEMBLY USING A PIEZOELECTRIC BENDER

[75] Inventor: Martin G. Gudzin, Dallas, Tex.

[73] Assignee: Teledyne Industries, Inc. Geotech Division, Dallas, Tex.

[21] Appl. No.: 950,098

[22] Filed: Oct. 10, 1978

[51] Int. Cl.² .................................................. H01L 41/10
[52] U.S. Cl. ..................................... 310/330; 310/331; 73/782; 340/666
[58] Field of Search ........................... 310/328–332; 340/565, 566, 665, 666; 73/774, 781, 782, 785, 786

[56] References Cited

U.S. PATENT DOCUMENTS

| 2,558,563 | 6/1951 | Janssen | 310/331 X |
| 3,519,800 | 7/1970 | Shill | 310/330 X |
| 3,599,479 | 8/1971 | Kutsay | 73/781 |
| 3,602,866 | 8/1971 | Saxl | 73/782 X |
| 3,782,182 | 1/1974 | Starr | 73/782 |
| 3,853,000 | 12/1974 | Barnett et al. | 73/782 |
| 3,903,733 | 9/1975 | Murayama et al. | 310/328 |
| 4,012,649 | 3/1977 | Cook et al. | 310/330 X |

Primary Examiner—Mark O. Budd
Attorney, Agent, or Firm—Dowell and Dowell

[57] ABSTRACT

An intrusion detecting sensor assembly comprising a bracket having one leg to be clamped to the surface of a structural member, for instance of a building, and having a second leg spaced from the first leg and also abutting said surface, the second leg being joined to the first leg by a bridge portion of the bracket supporting a piezoceramic transducer which is sensitive to bending of the bridge portion when the structural member is flexed by changes in its loading.

5 Claims, 4 Drawing Figures

INTRUSION DETECTING SENSOR ASSEMBLY USING A PIEZOELECTRIC BENDER

FIELD OF INVENTION

This invention relates to piezoceramic intrusion detector assemblies, and more particularly relates to detectors especially adapted to be mounted on a structural member, such as a building floor joist, to detect flexing thereof in response to an intrusion which changes the loading on the member.

BACKGROUND AND PRIOR ART

The detection of intrusions using sound or vibration sensing devices is well-known per se. For instance, U.S. Pat. No. 3,618,062 to Ott shows in FIG. 1A a plate having a piezoceramic disk fixed thereto and responsive to vibration of the plate resulting from an intrusion as measured by the transducer when the plate is attached to the wall of a room. FIG. 3 of that patent shows an assembly in which the mounting plate is parallel to the wall and clamped thereto at two spaced points.

U.S. Pat. No. 2,735,025 to Wiggins shows a piezoceramic plate which is supported at its two opposite ends by an L-shaped bracket, the device being operative to generate an electric potential proportional to deflections of the ceramic plate when the bracket is flexed.

Other patents showing beams carrying a ceramic plate and sensitive to deflections thereof include the phonograph pickup device shown in U.S. Pat. No. 3,144,522 to Bernstein and the surface irregularity measuring device shown in U.S. Pat. No. 2,728,222 to Becker et al.

THE INVENTION

The present invention provides an intrusion detecting sensor to be attached to a structural member, such as a floor joist of a building, in order to detect flexure of the structural member as a result of an intrusion which causes changes in the loading of the structural member. Although the actual flexing of such a structural member over a short increment of its length is very small, the present invention teaches a sensor for detecting such flexures, the sensor being so constructed and mounted that it provides a certain degree of mechanical amplification of the flexure which concentrates it in the vicinity of a piezoceramic transducer wafer. The assembly comprises a metal bracket having two legs which are spaced apart and disposed to abut the face of the structural member to which the device is attached at points which are separated from each other longitudinally of the member. The outer ends of the two legs are joined together by a bridge portion of the bracket having an inner conductive surface which is located between the legs and faces toward the structural member to which the assembly is attached. The inner end of the first leg of the assembly carries a mounting lug which is disposed to lie along the face of the structural member, this lug having means to co-operate with securing means for attaching the assembly to the structural member, for instance the lug being provided with screw holes. The mounting lug lies in a plane which is disposed obliquely to the plane of the bridge portion so that as the lug is tightened against the face of the structural member, the second leg is brought into tight abutment with the face of the member, thereby bending somewhat the bridge portion of the bracket. This bending is not concentrated at the center of the bracket, but is concentrated in a zone which is located between the center of the bracket and the mounting lug. It is at this zone that the piezoceramic transducer wafer is bonded to the conductive surface of the bridge portion of the bracket so that the deflection tends to be concentrated in the vicinity of the transducer wafer whose other surface carries a metal electrode. A cable having several conductors extends through a hole in the second leg of the bracket and is attached to said conductive inner surface of the bridge portion and to the electrode on the other surface of the piezoceramic transducer wafer. A shrinkable plastic sleeve is pulled over the bridge portion to overlie the ceramic transducer wafer and the cable, and is shrunk thereagainst so as to protect these members and also so as to confine the cable against the bridge portion of the bracket thereby preventing its withdrawal through the hole in the second leg.

It is a principal object of the present invention to provide an improved intrusion detecting sensor assembly which is sensitive to the deflection of a structural member to which it is attached due to flexure of that member. Although the member itself flexes substantially equally over the portion of its length covered by the attached bracket, the bracket has a bridge portion which tends to flex more in a zone nearer its first leg which is secured to the bracket, and flexes less in zones approaching its second leg. Therefore, the flexure tends to be concentrated in the vicinity of the piezoceramic wafer, rather than being distributed equally along the length of the bracket bridge portion, thereby improving by mechanical amplification the sensitivity of the piezoceramic transducer wafer to small increments of flexure of the structural member.

It is another important object of this invention to provide an intrusion detecting sensor assembly wherein the relatively delicate transducer wafer is mounted on the inner surface of the bridge portion where it tends to be protected from mechanical damage after the intrusion detecting assembly is attached to a structural member. Moreover, the cable passes through the second leg of the bracket so that it will not be in the way when securing the mounting lug which is attached to the first leg against the face of the structural member, for instance by screws or nails, or by other suitable fastening devices.

Still another major object of the invention is to provide an intrusion detecting sensor assembly in which the second leg which causes the bridge portion to flex is spaced from the first leg which mounts the bridge portion to the face of the structural member, and in which the mounting lug is canted with respect to a plane joining the inner ends of both legs in such a way that the second leg is driven tightly against the surface of the structural member when the mounting bracket is tightened thereagainst. As a result, the bridge portion is bent so that it is pre-tensioned in flexure, and this bending tends to be concentrated in the same zone where the piezoceramic transducer wafer is mounted.

It is a further object of the invention to provide a sensor assembly of the type set forth above wherein the bridge portion of the bracket is long as compared with the lengths of the legs so that the loci at which the inner ends of the legs contact the face of the structural member are spaced apart longitudinally of the structural member in order to provide a degree of displacement of these loci due to flexing of the structural member which is of a measurable and useful amplitude for the purpose of detecting intrusions. The sensor assembly according to the present invention should be mounted near the center of length of a structural member, far from the supporting points of that member, so as to be located where the flexing of the structural member tends to be maximized.

It is still another object of the invention to provide an improved intrusion detecting sensor assembly which is inexpensive to manufacture, and which provides a mechanically strong transducer capable of passive operation.

Other objects and advantages of the invention will become apparent during the following discussion of drawings.

THE DRAWINGS

Figure 1:
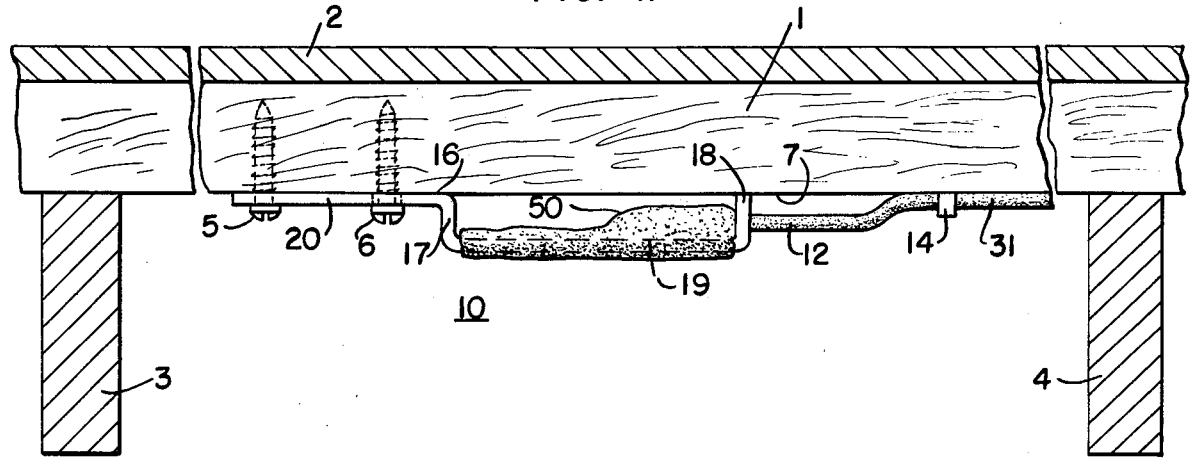
FIG. 1 is a side elevation partly in cross-section of a typical floor joist structure of a building, and showing an intrusion detecting sensor assembly according to the present invention attached thereto.

Referring now to the drawings, FIG. 1 shows a typical structural member of a building comprising a wooden floor joist 1 supporting a floor 2, the floor joist in turn being supported at its ends on beams 3 and 4. Only the central portion of the floor joist is illustrated in this view because it is assumed that the intrusion sensor would normally be mounted near the center of a joist rather than in the vicinity of its beam supported ends since in the usual case the flexure of the floor joist is maximum in the vicinity of its center.

Beneath the floor joist 1 is mounted an intrusion detecting sensor assembly generally referred to by the reference character 10, the assembly being attached to the floor joist by securing means such as screws 5 and 6, although other means such as nails, bolts, rivets, etc. can be used as well. The sensor assembly itself has a cable 12 extending therefrom which should be suitably held to the floor joist or other nearby structural members by staples, such as the staple 14. It is desirable that the first staple be secured four or five inches from the body of the sensor assembly, rather than immediately adjacent thereto so that the cable is not bent too sharply.

Figure 2:
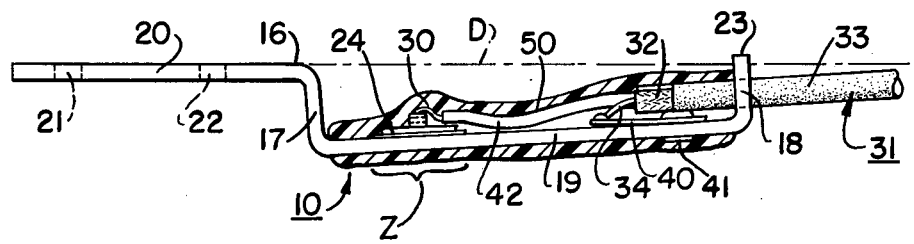
FIG. 2 is a side elevation of an unmounted sensor assembly according to the present invention showing the protective plastic tubing cut away to illustrate the parts covered thereby.
Figure 3:
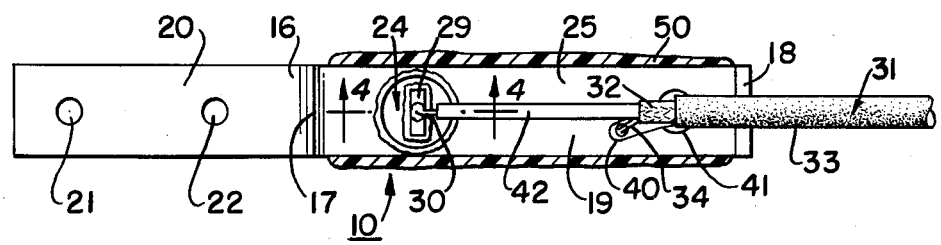
FIG. 3 is a plan view of the assembly with the protective plastic tubing broken away to show the inner surface of the bridge portion of the bracket with the parts attached thereto.

Referring now to FIGS. 2 and 3, the intrusion detecting sensor assembly comprises a bracket 16 having a first leg 17 and a second leg 18, the inner ends of the legs abutting the lower face 7 of the structural member to which the assembly is mounted. In the present disclosure, the legs 17 and 18 stand substantially normal to the joist face 7, although a more acute angle of engagement therewith would be satisfactory. The outer ends of the legs are joined by a bridge portion 19 of the bracket, the bridge portion 19 being long as compared with the length of the legs 17 and 18 as measured between their inner and outer ends.

The first leg 17 has a mounting lug 20 extending leftwardly from its inner end and away from the bridge portion 19. The mounting lug 20 has spaced holes 21 and 22 for receiving the securing means 5 and 6.

As illustrated in FIG. 2 the sensor assembly is unmounted, and therefore its bracket is in what can be described as a relaxed condition. The bridge portion 19 in relaxed condition is essentially flat, and lies in a plane which converges beyond the second leg 18 with the plane of the mounting lug 20 as indicated by the dashed line D. The fact that the plane of the mounting lug 20 is canted with respect to the plane of the bridge portion 19 means that the inner end 23 of the second leg 18 passes through the plane defined by the dashed line D. Thus, when the securing means 5 and 6 are tightened to draw the mounting lug 20 tightly against the face 7 of the joist 1, the inner end 23 of the second leg 18 is deflected downwardly thereby causing bending of the bridge portion 19. The bending of the bridge portion is partly distributed along its length, but it tends to be concentrated more in the zone Z below the piezoceramic transducer assembly which is shown in greater detail in FIG. 4. This concentration is the reason why the transducer assembly 24 is mounted to the left of center on the bridge portion 19, rather than squarely in the center of that bridge portion. The transducer assembly 24 should be mounted in the zone of greatest flexure of the bridge portion 19.

Figure 4:
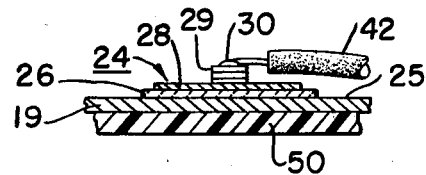
FIG. 4 is an enlarged fragmentary section taken at the line 4—4 in FIG. 3, the upper portion of the plastic sleeve having been omitted from this view.

Referring now to FIG. 4, the transducer itself is made in a well-known manner and comprises a piezoceramic disk 26 which is bonded, using a well-known type of epoxy which becomes conductive when cured under pressure, to the metal inner surface 25 of the bridge portion 19 of the bracket. The ceramic disk 26 has an electrode 28 which is similarly bonded by conductive epoxy to the exposed opposite surface of the piezoceramic disk 26, and the electrode 28 has a conductive flexible tab 29 fastened to it also using the aforementioned conductive epoxy resin. The tab 29 is made U-shaped and its outer leg is soldered to the center conductor wire 30 of the coaxial cable 31 which extends from the assembly and leads to an electronic circuit which is not illustrated. The circuit is of a type which amplifies and detects the presence of a voltage from the transducer assembly 24, and sounds an alarm or performs some type of work as may be suitable.

The shield of the coaxial cable 31 can be either of the usual braid type, or it may comprise a new type of coaxial cable which is now being used in intrusion detection warning units. The cable differs in that it has a wound foil shield 32 located beneath the jacket 33 of the cable, and the shield also includes a multiple strand drain wire 34 which extends lengthwise of the cable and is in contact with the foil shield 32 all the way therealong. The drain wire 34 is brought out of the shield and soldered to a lug which is, in turn, secured by suitable means such as a rivet 41 to the bridge portion of the bracket. This lug serves both to anchor the cable and also to ground its shield. The cable has insulation 42 between its inner conductor wire 30 and its outer conductor shield 32, this insulation preferably being made of polypropylene instead of polystyrene so that the inner insulation 42 will not tend to melt during soldering of the various conductors of the cable. The higher melting point of the polypropylene insulation also prevents it from melting when a length of heat shrink tubing 50 is shrunk onto the bridge portion 19 covering the end of the cable 31 located therewithin and also covering and protecting the piezoceramic transducer assembly 24. The particular heat shrink tubing 50 which is used can be ordinary heat shrink tubing which merely contracts upon the parts including the cable and transducer assembly 24 within the bridge portion 19 of the bracket. However, it is preferable to use a type of heat shrink tubing having an inner meltable coating which melts at the heat shrink temperature and bonds to the jacket 33 of the cable, thereby holding it more tightly within the assembly. This type of tubing is manufactured by the Alpha Wire Corporation of Elizabeth, N.J. and is their type number FIT-300.

A good idea of suitable proportions for the present intrusion detecting sensor assembly can be obtained by scaling the drawing of FIGS. 2 and 3 which are substantially full-size drawings of the transducer currently being manufactured. The unit is a little less than five inches long, including the mounting lug, and the width of the bracket material is about 9/16 inch.

The invention is, however, not to be limited to the exact form or proportions shown in the drawings for obviously changes may be made therein within the scope of the following claims.

I claim:

1. An intrusion detecting sensor assembly to be attached by securing means to the face of a structural member which is subject to flexing in response to an intrusion which changes the loading on the structural member, comprising:
   (a) a one-piece sheet metal bracket having spaced-apart first and second substantially parallel legs with their inner ends disposed to abut the face of the structural member and with their outer ends integrally joined together by a bridge portion of the bracket which is long as compared with the lengths of the legs and which has an inner conductive surface located between the legs, the inner end of the first leg having an integrally-formed mounting lug disposed to lie along the face of the structural member and be attached thereto by said securing means, the lug extending away from the second leg and lying in a plane which is angled so that it converges with the plane of the bridge portion beyond the second leg of the bracket whereby when the lug is tightened against the face of the structural member the second leg will abut said face and bend the bridge portion;
   (b) a piezoceramic transducer wafer having one side conductively bonded to the inner conductive surface of the bridge portion of the bracket, and having a metal electrode conductively bonded to its other side; and
   (c) the second leg having a hole through it, and the sensor assembly further including a cable extending through the hole in the second leg and having conductors connected electrically with the inner conductive surface of the bracket and with the metal electrode.

2. The sensor assembly as claimed in claim 1, wherein said bending of the bridge portion is greatest at a zone located between the first leg and the center of the bridge portion, said piezoceramic transducer wafer being bonded to the surface of the bridge portion at said zone.

3. The sensor assembly as claimed in claim 1, wherein said cable is coaxial and has a jacket which is cut away to expose an inner conductor and an outer conductor comprising a shield, the shield being attached to said bracket surface near the wafer, and the inner conductor being connected to said metal electrode.

4. The sensor assembly as claimed in claim 3, wherein a flexible conductive tab is coupled between said center conductor and said metal electrode to relieve strain on the transducer when the cable is tensioned or flexed.

5. The sensor assembly as claimed in claim 1, wherein a heat shrinkable insulating tubing surrounds said bridge portion and transducer wafer and is shrunk tightly thereagainst and onto the cable to provide a strong unified assembly.

* * * * *